(12) United States Patent
Jang et al.

(10) Patent No.: US 8,675,167 B2
(45) Date of Patent: Mar. 18, 2014

(54) POLYMER DISPERSED DISPLAY PANELS INCLUDING QUANTUM DOTS AND DISPLAY APPARATUSES INCLUDING THE SAME

(75) Inventors: Jae-eun Jang, Seoul (KR); Seung-nam Cha, Seoul (KR); Jae-eun Jung, Seoul (KR); Yong-wan Jin, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 377 days.

(21) Appl. No.: 12/654,344

(22) Filed: Dec. 17, 2009

(65) Prior Publication Data

US 2010/0208172 A1 Aug. 19, 2010

(30) Foreign Application Priority Data

Feb. 17, 2009 (KR) .................. 10-2009-0012974

(51) Int. Cl.
*C09K 19/52* (2006.01)
*C09K 19/60* (2006.01)

(52) U.S. Cl.
USPC ............ 349/163; 349/164; 349/166; 349/167

(58) Field of Classification Search
USPC .................... 349/163–164, 166–167
See application file for complete search history.

(56) References Cited

U.S. PATENT DOCUMENTS

| 6,864,626 | B1 * | 3/2005 | Weiss et al. .................. 313/503 |
| 7,295,266 | B2 | 11/2007 | Stephenson et al. |
| 7,576,478 | B2 | 8/2009 | Hikmet |

FOREIGN PATENT DOCUMENTS

| JP | 5-142582 | 6/1993 |
| JP | 10-170918 | 6/1998 |
| JP | 2000-171783 | * 6/2000 |
| JP | 2002-006299 | 1/2002 |
| JP | 2002-131719 | 5/2002 |
| JP | 2004-279985 | 10/2004 |
| JP | 2007-532968 | 11/2007 |
| KR | 10-2004-0089836 | 10/2004 |
| KR | 10-2004-0100002 | 12/2004 |
| KR | 1999-024959 | 3/2005 |
| KR | 10-2007-0031507 | 3/2007 |

OTHER PUBLICATIONS

Polymer science and technology for new generation photonics and biophotonics, Current opinion in solid state and materials science 8 (2004) 11-19, Paras Prasad.*
Japanese Office Action dated Oct. 22, 2013, issued in Japanese in Japanese Patent Application No. 2010-029117 and English translation.

* cited by examiner

*Primary Examiner* — Lauren Nguyen
(74) *Attorney, Agent, or Firm* — Harness, Dickey & Pierce, P.L.C.

(57) ABSTRACT

A polymer dispersed display apparatus includes a polymer layer, and a plurality of liquid crystal drops dispersed in the polymer layer. Quantum dots emitting a plurality of colors of light are mixed in the liquid crystal drops. Therefore, the polymer dispersed display apparatus displays colors without the need for a color filter. Thus, the polymer dispersed display apparatus need not include a polarization plate and a color filter, so that a light usage efficiency of the polymer dispersed display apparatus increases.

30 Claims, 4 Drawing Sheets

FIG. 1

BLUE LIGHT

FIG. 2

UV LIGHT

POLYMER DISPERSED DISPLAY PANELS INCLUDING QUANTUM DOTS AND DISPLAY APPARATUSES INCLUDING THE SAME

CROSS-REFERENCE TO RELATED APPLICATION(S)

This application claims priority under 35 U.S.C. §119 to Korean Patent Application No. 10-2009-0012974, filed on Feb. 17, 2009, in the Korean Intellectual Property Office, the disclosure of which is incorporated herein in its entirety by reference.

BACKGROUND

1. Field

The general inventive concept relates to display apparatuses using a polymer dispersed liquid crystal, for example, to polymer dispersed display panels and apparatuses including quantum dots.

2. Description of the Related Art

Related art liquid crystal display (LCD) apparatuses include an optical shutter having a liquid crystal layer and polarization plates formed on each side of the liquid crystal layer. Related art LCD apparatuses also include a color filter. The color filter transmits light of a certain color from among light passing through the optical shutter. However, in such related art LCD apparatuses, about 50% of light is lost due to the two polarization plates, and about 33% of light is lost due to the color filter. Therefore, related art LCD apparatuses have a relatively low light usage efficiency of (e.g., about 10%).

Recently, a polymer dispersed liquid crystal (PDLC) device, which operates as an optical shutter without using two polarization plates has been commercialized. The PDLC device is a new type of LCD device and is formed by mixing a liquid crystal in a polymer and then hardening the polymer using ultraviolet (UV) rays. When the polymer is hardened by the UV rays, phases of the polymer and the liquid crystal are separated. As a result, a plurality of liquid crystal drops are confined in the hardened polymer. Therefore, the PDLC device has a structure in which a plurality of liquid crystal drops are dispersed in a hardened polymer layer.

In these PDLC devices, when no voltage is applied thereto, incident light is scattered at interfaces between the polymer and the liquid crystal drops due to a difference between refractive indexes of the polymer and the liquid crystal. Because many liquid crystal drops are dispersed in the polymer, the incident light is scattered repeatedly. Therefore, the PDLC device is opaque when no voltage is applied thereto. On the other hand, when a voltage is applied to the PDLC device, the liquid crystal drops are aligned in a constant direction, and the refractive index of the liquid crystal becomes equal to that of the polymer. Therefore, incident light passes through the PDLC device. Accordingly, the PDLC device is transparent when a voltage is applied thereto.

Due to the above-described properties, these PDLC devices may operate as an optical shutter without using a polarization plate. Recently, a technology of mixing a dye that absorbs light in a liquid crystal has been suggested to absorb dispersed light. When this technology is used, the PDLC becomes black when no voltage is applied thereto.

SUMMARY

One or more example embodiments provide polymer dispersed liquid crystal (PDLC) display apparatuses, which may realize colors without using a color filter.

One or more example embodiments provide a display panel. According to at least this example embodiment, the display panel includes a polymer layer and a plurality of liquid crystal drops dispersed in the polymer layer. A plurality of quantum dots are mixed in the liquid crystal drops, and are excited by an excitation light to emit a plurality of colors of light. The display panel may be one of a liquid crystal display panel, an electronic-paper display panel, a flexible display panel, etc. The excitation light may be blue or ultra-violet (UV) light.

According to at least some example embodiments, the display panel may include a plurality of pixels. Each of the pixels may include a blue sub-pixel, a green sub-pixel, and a red sub-pixel. The liquid crystal drops in the green sub-pixel may include quantum dots, which are excited by blue light to emit green light. The liquid crystal drops in the red sub-pixel may include quantum dots, which are excited by the blue light to emit red light. The liquid crystal drops of the blue sub-pixel may not include the quantum dots. Alternatively, the liquid crystal drops in the green sub-pixel may include quantum dots, which are excited by the UV light to emit green light. The liquid crystal drops in the red sub-pixel may include quantum dots, which are excited by the UV light to emit red light. The liquid crystal drops of the blue sub-pixel include quantum dots, which are excited by the UV light to emit blue light.

According to at least some example embodiments, quantum dots may also be dispersed outside of the liquid crystal drops in the polymer layer.

One or more other example embodiments provide a display apparatus. The display apparatus may be a liquid crystal display apparatus, an electronic-paper display apparatus, a flexible display apparatus, etc. According to at least one example embodiment, the display apparatus includes a display panel. The display panel includes a polymer layer and a plurality of liquid crystal drops dispersed in the polymer layer. The display panel further includes a plurality of quantum dots mixed in the liquid crystal drops and excited by an excitation light to emit a plurality of colors of light. The display apparatus further includes a backlight unit configured to emit the excitation light toward the liquid crystal display panel. According to at least some example embodiments, the excitation light may be blue or UV light.

According to at least some example embodiments, the display panel may include a plurality of pixels. Each of the plurality of pixels may include a blue sub-pixel, a green sub-pixel, and a red sub-pixel. The liquid crystal drops in the green sub-pixel may include quantum dots, which are excited by blue light to emit green light. The liquid crystal drops in the red sub-pixel may include quantum dots, which are excited by the blue light to emit red light. The liquid crystal drops of the blue sub-pixel may not include quantum dots. Alternatively, the liquid crystal drops in the green sub-pixel may include quantum dots, which are excited by UV light to emit green light. The liquid crystal drops in the red sub-pixel may include quantum dots, which are excited by UV light to emit red light. The liquid crystal drops of the blue sub-pixel may include quantum dots, which are excited by UV light to emit blue light.

The display apparatus may further include a color filter layer. The color filter layer may include a blue filter, a green filter, and a red filter. The blue filter, the green filter and the red filter may be arranged to correspond to the blue, green, and red sub-pixels respectively. Alternatively, the display apparatus may include a color filter layer having a cyan filter, a yellow filter, and a magenta filter. The cyan filter, the yellow filter and the magenta filter may be arranged to correspond to the blue, green, and red sub-pixels, respectively.

Barriers for separating the blue, green, and red sub-pixels from each other may be further disposed in the polymer layer.

The backlight unit may operate as a reflective plate for reflecting external light incident on the liquid crystal display panel.

According to at least some example embodiments, the backlight unit may be configured to be selectively activated and deactivated based on sensed ambient light. When the backlight unit is deactivated, the liquid crystal display apparatus may operate in a reflective mode. When the backlight unit is activated, the liquid crystal display apparatus may operate in one of a transmissive mode and a transmissive-reflective mode.

At least one other example embodiment provides a display panel including a polymer layer and a plurality of liquid crystal drops. The plurality of liquid crystal drops are dispersed in the polymer layer. The display panel further includes a means for emitting one of a plurality of colors of light in response to an excitation light. The means for emitting are mixed in the liquid crystal drops.

The display panel may further include a plurality of pixels. Each of the plurality of pixels may include a blue sub-pixel, a green sub-pixel, and a red sub-pixel. The green sub-pixel may include a means for emitting green light in response the excitation light. The red sub-pixel may include a means for emitting red light in response the excitation light.

At least one other example embodiment provides a display apparatus a display panel and a backlight unit configured to emit the excitation light toward the display panel. The display panel further includes a polymer layer and a plurality of liquid crystal drops. The plurality of liquid crystal drops are dispersed in the polymer layer. The display panel further includes a means for emitting one of a plurality of colors of light in response to an excitation light. The means for emitting are mixed in the liquid crystal drops.

BRIEF DESCRIPTION OF THE DRAWINGS

The general inventive concept will become apparent and more readily appreciated from the following description of example embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below by referring to the figures to explain aspects of the general inventive concept.

Various example embodiments will now be described more fully with reference to the accompanying drawings in which some example embodiments are shown. In the drawings, the thicknesses of layers and regions are exaggerated for clarity.

Detailed illustrative example embodiments are disclosed herein. However, specific structural and functional details disclosed herein are merely representative for purposes of describing example embodiments. This invention may, however, may be embodied in many alternate forms and should not be construed as limited to only the example embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element or layer is referred to as being "formed on," another element or layer, it can be directly or indirectly formed on the other element or layer. That is, for example, intervening elements or layers may be present. In contrast, when an element or layer is referred to as being "directly formed on," to another element, there are no intervening elements or layers present. Other words used to describe the relationship between elements or layers should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Although example embodiments will be discussed herein with respect to a liquid crystal display (LCD) and LCD apparatus implementation, example embodiments are applicable to other implementations such as flexible displays, flexible display apparatuses, electronic paper (e-paper) displays and e-paper display apparatuses, etc.

Figure 1:
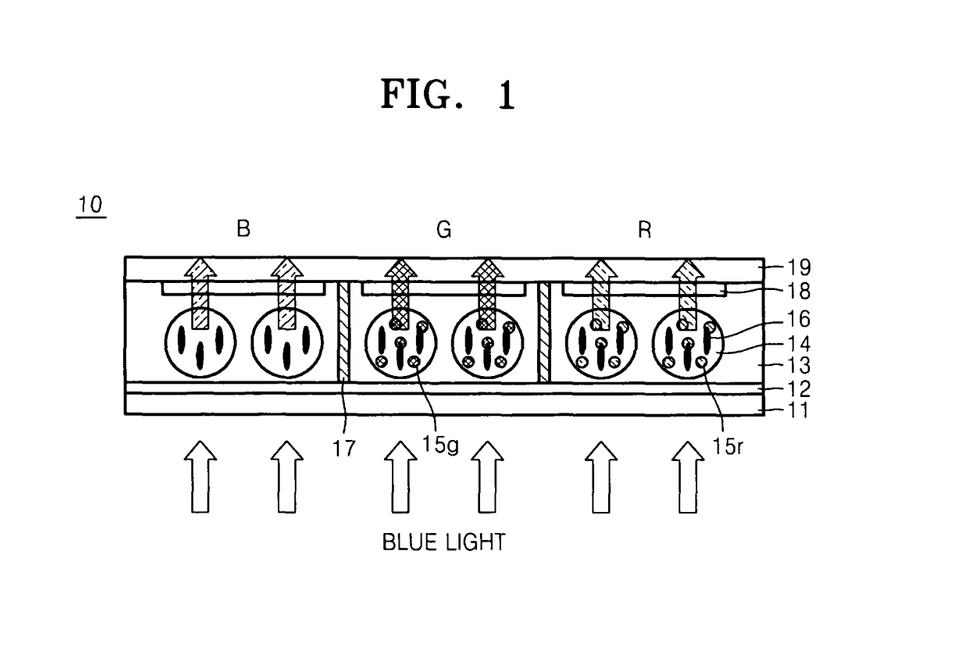
FIG. 1 is a cross-sectional view showing a structure of a polymer dispersed liquid crystal display panel according to an example embodiment.

FIG. 1 is a cross-sectional view showing a polymer dispersed liquid crystal display panel 10 according to an example embodiment. For convenience and simplicity, only one pixel of the polymer dispersed liquid crystal display panel 10 is shown. Like other display panels, however, the polymer dispersed liquid crystal display panel 10 includes a plurality of pixels, which are basic units for displaying images. In addition, as shown in FIG. 1, each of the pixels may include blue, green, and red sub-pixels for realizing colors.

Referring to FIG. 1, the polymer dispersed liquid crystal display panel 10 includes a first transparent substrate 11 and a second transparent substrate 19 arranged to face each other. A first transparent electrode 12 and a second transparent electrode 18 are disposed between the first and second transparent substrates 11 and 19, and are arranged to face each other. A polymer layer 13 is disposed between the first and second transparent electrodes 12 and 18. A plurality of liquid crystal drops 14 are dispersed in the polymer layer 13. The first and second transparent substrates 11 and 19, and the first and second transparent electrodes 12 and 18 may have the same or substantially the same structures and functions as those used in other liquid display panels, and thus detailed descriptions thereof will not be presented.

As described above, the polymer layer 13 may be formed by mixing and dispersing a liquid crystal drops in a polymer and hardening the polymer using ultraviolet (UV) rays. FIG. 1 shows a relatively small number of liquid crystal drops 14 for convenience and simplicity. However, a relatively large number of fine liquid crystal drops 14 may be densely dispersed in the polymer layer 13. Therefore, when refractive indexes of the liquid crystal drops 14 and the polymer layer 13 are different from each other, light is repeatedly scattered by the plurality of liquid crystal drops 14. As a result, relatively little light passes through the polymer layer 13.

Still referring to FIG. 1, a plurality of quantum dots 15r or 15g are mixed in each of the liquid crystal drops 14 dispersed in the polymer layer 13. The quantum dots 15r or 15g are excited by light of a certain wavelength to emit light of a given, desired or predetermined color. In the example embodiment shown in FIG. 1, the quantum dots 15r and 15g are excited by blue light. The quantum dots 15r or 15g, which emit light of different colors, may be mixed in the liquid crystal drops 14 in each of the sub-pixels. For example, the quantum dots 15r, which are excited by blue light to emit red light, are mixed in the liquid crystal drops 14 of the red sub-pixel. The quantum dots 15g, which are excited by blue light to emit green light, are mixed in the liquid crystal drops 14 of the green sub-pixel. Because blue light is used as excitation light in this example, quantum dots may be omitted from the liquid crystal drops 14 of the blue sub-pixel. Thus, in this example embodiment the blue sub-pixel need not include quantum dots. The blue sub-pixel only transmits or scatters light according to application of a voltage.

In the example embodiment shown in FIG. 1, the quantum dots 15r and 15g are only mixed in the liquid crystal drops 14. However, the quantum dots 15r and 15g may also be dispersed in the polymer layer 13 between the liquid crystal drops 14. For example, the quantum dots 15r emitting red light may be dispersed in the red sub-pixel region of the polymer layer 13, and the quantum dots 15g emitting green light may be dispersed in the green sub-pixel region of the polymer layer 13.

As described above, when the refractive index of the liquid crystal drops 14 and the refractive index of the polymer layer 13 are different from each other, light is scattered by the liquid crystal drops 14. Dyes 16 for absorbing the scattered light may also be mixed in the liquid crystal drops 14. The dyes 16 may be black dyes for efficiently absorbing the scattered light. However, the dyes 16 may be colors other than black. For example, dyes 16 of different colors may be mixed in each of the sub-pixels to correct the color emitted by the quantum dots 15r and 15g or the light of excitation light. Otherwise, the dyes 16 of one color may be mixed to correct the color of the entire display panel 10.

In addition, referring to FIG. 1, barriers 17 may be installed between the sub-pixels. The barriers 17 separate the sub-pixels from each other. Because the liquid crystal drops 14 are fixed in the polymer layer 13 of the polymer dispersed liquid crystal display panel 10, the barriers 17 may be omitted. However, when present the barriers 17 may block light to suppress and/or minimize the effect of light emitted from neighboring sub-pixels.

Hereinafter, operations of the polymer dispersed liquid crystal display panel 10 having the above-structure will be described. In these examples, it is assumed that blue light is emitted from a backlight unit (not shown). When no voltage is applied to the liquid crystal drops 14 from the first and second transparent electrodes 12 and 18, the refractive index of the liquid crystal drops 14 is different from that of the polymer layer 13. The light is then scattered by the liquid crystal drops 14 and rarely passes through the polymer layer 13. Most of the scattered light is absorbed by the dyes 16, and thus, the polymer dispersed liquid crystal display panel 10 becomes black.

When a voltage is applied to the liquid crystal drops 14, the liquid crystal in the liquid crystal drops 14 is oriented in a given, desired or predetermined direction. As a result, the refractive index of the liquid crystal drops 14 is the same or substantially the same as that of the polymer layer 13. In this case, light passes through the liquid crystal drops 14, and the quantum dots 15r and 15g in the liquid crystal drops 14 become excited. For example, in the red sub-pixel, the quantum dots 15r are excited by blue light to emit red light (R). In the green sub-pixel, the quantum dots 15g are excited by blue light to emit green light (G). Because many liquid crystal drops 14 are concentrated in the polymer layer 13, most of the blue light incident from outside of the polymer layer 13 may change to red light or green light. Therefore, red light R is essentially the only color emitted from the red sub-pixels, and green light G is essentially the only color emitted from the green sub-pixels. On the other hand, the blue sub-pixel does not include quantum dots. Therefore, the blue light incident from the outside passes through the blue sub-pixel to emit blue light (B).

In the polymer dispersed liquid crystal display panel 10 having the above-described structure, because the quantum dots 15r and 15g are mixed in the liquid crystal drops 14, color images may be realized without the need for a color filter. In addition, the polymer dispersed liquid crystal display panel 10 may perform as an optical shutter without a polarization plate. Because no polarization plate and color filter are used, liquid crystal display apparatuses according to example embodiments may have an improved light usage efficiency compared to related art liquid crystal display apparatuses having both a polarization plate and color filter. In addition, colors of relatively high purity may be obtained from the optical modulation using the quantum dots 15r and 15g, and thus, color visibility may also be improved.

Figure 2:
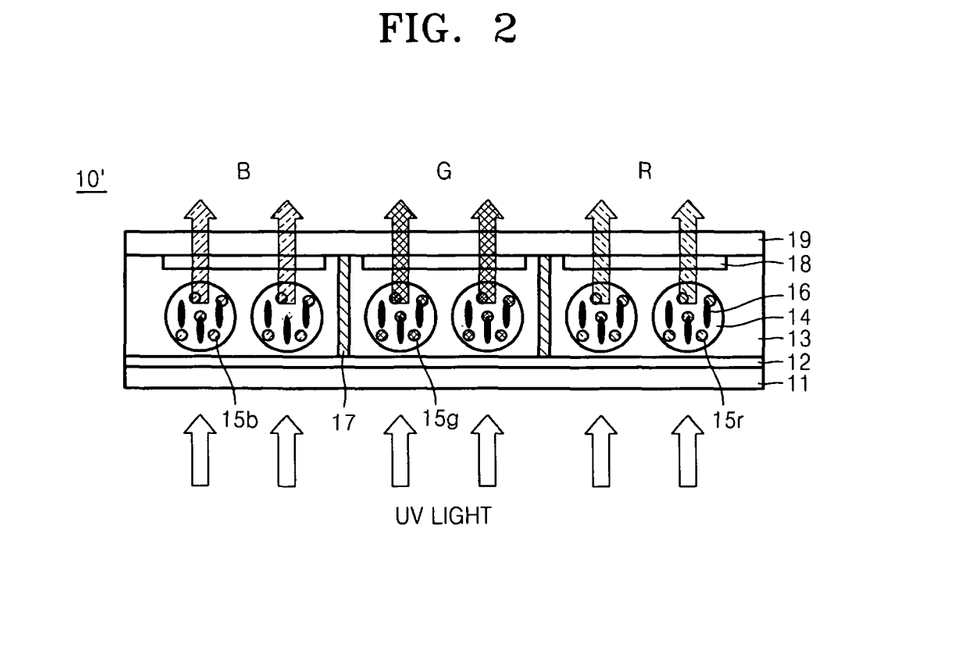
FIG. 2 is a cross-sectional view showing a structure of a polymer dispersed liquid crystal display panel according to another example embodiment.

FIG. 2 is a cross-sectional view of a polymer dispersed liquid crystal display panel 10' according to another example embodiment. For convenience, only one pixel of the polymer dispersed liquid crystal display panel 10' is shown. Like other display panels, however, the polymer dispersed liquid crystal display panel 10' includes a plurality of pixels, which are basic units for displaying images. In addition, as shown in FIG. 2, each of the pixels may include blue, green, and red sub-pixels for realizing colors.

When comparing the polymer dispersed liquid crystal display panel 10' with the polymer dispersed liquid crystal display panel 10 illustrated in FIG. 1, the polymer dispersed liquid crystal display panel 10' illustrated in FIG. 2 includes a plurality of quantum dots 15r', 15g', and 15b', which are excited by ultraviolet (UV) light. The other components of the polymer dispersed liquid crystal display panel 10' are the same or substantially the same as those the polymer dispersed liquid crystal display panel 10 of FIG. 1.

In FIG. 2, because the quantum dots 15r', 15g', and 15b' are excited by UV light, quantum dots 15b' are present in the liquid crystal drops 14 of blue sub-pixels. The quantum dots 15g', which are excited by UV light to emit green light, are mixed in the green sub-pixels. The quantum dots 15r', which are excited by UV light to emit red light, are mixed in the red sub-pixels. The quantum dots 15b', which are excited by UV light to emit blue light, are mixed in the blue sub-pixels.

Figure 3:
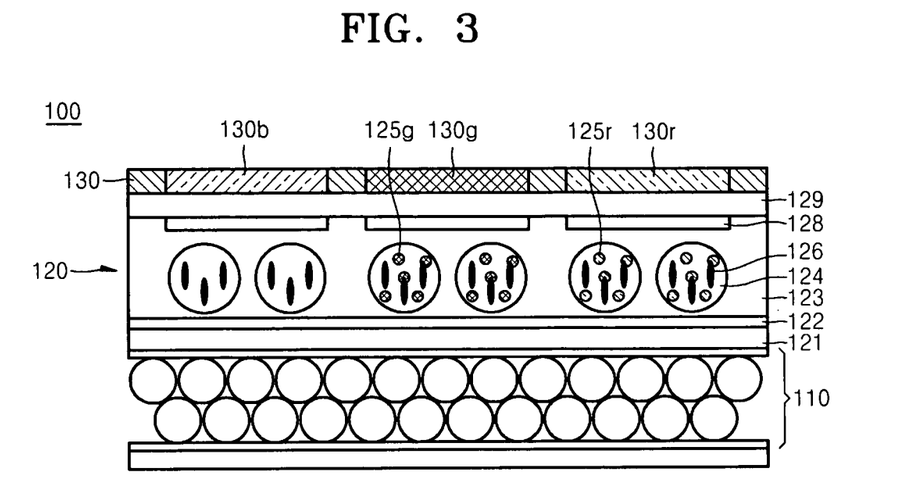
FIG. 3 is a cross-sectional view showing a polymer dispersed liquid crystal display apparatus according to an example embodiment.

FIG. 3 is a cross-sectional view of a polymer dispersed liquid crystal display apparatus according to another example embodiment. For convenience and simplicity, only one pixel of the polymer dispersed liquid crystal display apparatus 100 is shown.

Referring to FIG. 3, the polymer dispersed liquid crystal display apparatus 100 includes a backlight unit 110, a polymer dispersed liquid crystal display panel 120, and a color filter layer 130. The polymer dispersed liquid crystal display panel 120 has the same structure as the polymer dispersed liquid crystal display panel 10 illustrated in FIG. 1, except for the barriers. Although, the polymer dispersed liquid crystal display panel 120 may have the same structure as the polymer dispersed liquid crystal display panel 10' shown in FIG. 2.

Referring to FIG. 3, the polymer dispersed liquid crystal display panel 120 includes a first transparent substrate 121 and a second transparent substrate 129 arranged to face each other. The polymer dispersed liquid crystal display panel further includes a first transparent electrode 122 and a second transparent electrode 128 disposed between the first and second transparent substrates 121 and 129. The first transparent electrode 122 and a second transparent electrode 128 are also arranged to face each other. A polymer layer 123 is disposed between the first and second transparent electrodes 122 and 128. A plurality of liquid crystal drops 124 are dispersed in the polymer layer 123. In addition, a plurality of quantum dots 125r or 125g and a plurality of dyes 126 are mixed in each of the liquid crystal drops 124.

In red sub-pixels of the polymer dispersed liquid crystal display panel 120, the quantum dots 125r are mixed in the liquid crystal drops 124. The quantum dots 125r are quantum dots that are excited by blue light to emit red light. In addition, the quantum dots 125g are mixed in the liquid crystal drops 124 of green sub-pixels. The quantum dots 125g are quantum dots that are excited by blue light to emit green light. The blue sub-pixels do not include quantum dots in this example embodiment.

The backlight unit 110 irradiates blue light to the polymer dispersed liquid crystal display panel 120. The backlight unit 110 may be a light emitting device such as a light emitting diode (LED), an organic electroluminescence (EL) device, an inorganic EL device, a plasma display panel (PDP), a field emission device (FED), or the like. As noted above, in other example embodiments, the polymer dispersed liquid crystal display panel 10' illustrated in FIG. 2 may be used as the display panel 120. In this case, the backlight unit 110 may irradiate UV light.

The color filter layer 130 includes a blue filter 130b, a green filter 130g, and a red filter 130r. The blue filter 130b, the green filter 130g and the red filter 130r are arranged to correspond to the blue, green, and red sub-pixels of the polymer dispersed liquid crystal display panel 120, respectively.

When only light emitted from the backlight unit 110 is used, the polymer dispersed liquid crystal display apparatus 100 operates in a transmissive mode. In this case, the color filter layer 130 may be omitted. However, when the polymer dispersed liquid crystal display apparatus 100 operates in a semi-transmissive mode in which the polymer dispersed liquid crystal display apparatus 100 uses light emitted from the backlight unit 110 as well as external light, the polymer dispersed liquid crystal display apparatus 100 may further include the color filter layer 130.

Figure 4A:
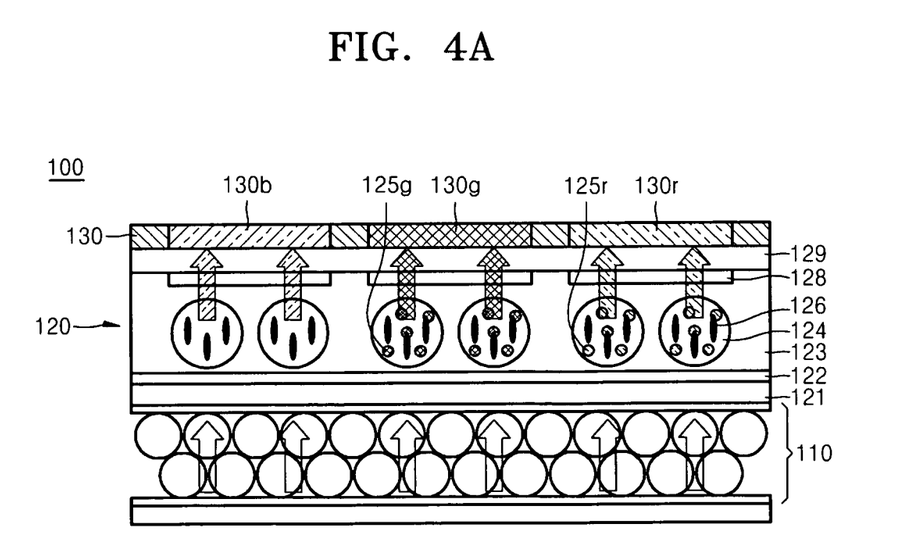
FIGS. 4A through 4C are cross-sectional views illustrating operations of the polymer dispersed liquid crystal display apparatus illustrated in FIGS. 3.
Figure 4B:
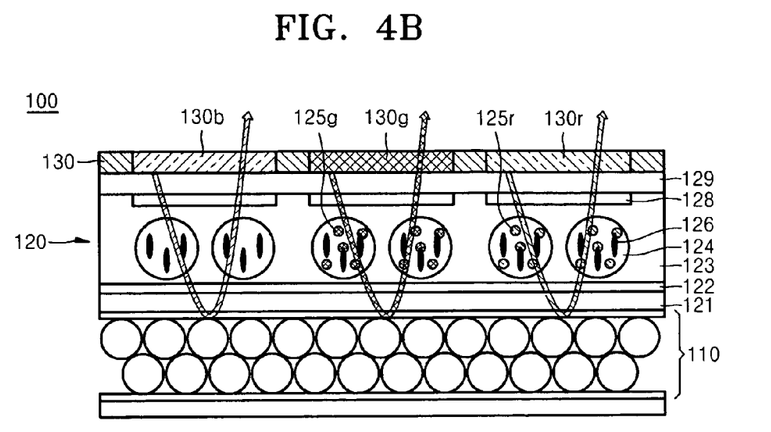
Figure 4C:
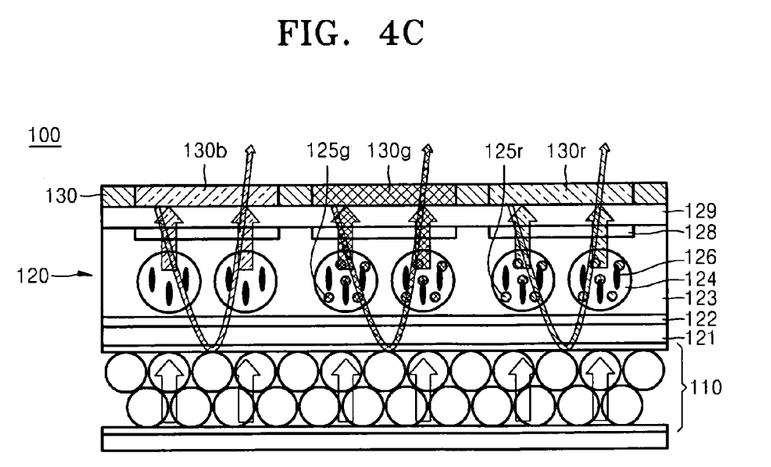

FIGS. 4A through 4C are cross-sectional views illustrating example operations of the polymer dispersed liquid crystal display apparatus 100 illustrated in FIG. 3.

In FIG. 4A, the polymer dispersed liquid crystal display apparatus 100 is configured to operate in the transmissive mode. In this example, when a voltage is applied to the polymer dispersed liquid crystal display apparatus 100, the backlight unit 110 emits blue light toward the polymer dispersed liquid crystal display panel 120. As described above, the blue light emitted from the backlight unit 110 excites the quantum dots 125r and 125g in the red and green sub-pixels of the polymer dispersed liquid crystal display panel 120. In addition, the blue light passes through the blue sub-pixel of the polymer dispersed liquid crystal display panel 120. Therefore, red, green, and blue light is emitted from the red, green, and blue sub-pixels, respectively.

The emitted red light passes through the red filter 130r, which is arranged to correspond to the red sub-pixel. The green light passes through the green filter 130g, which is arranged to correspond to the green sub-pixel. The blue light passes through the blue filter 130b, which is arranged to correspond to the blue sub-pixel. According to at least this example embodiment, only colored light corresponding to each of the filters 130r, 130g, and 130b is incident on each of the filters 130r, 130g, and 130b, and thus, optical loss caused by the filters 130r, 130g, and 130b is reduced.

In FIG. 4B, the polymer dispersed liquid crystal display apparatus 100 is configured to operate in a reflective mode.

Referring to FIG. 4B, external light such as sunlight or a lamp light is incident on the polymer dispersed liquid crystal display apparatus 100. At this time, it is assumed that a voltage is applied to the polymer dispersed liquid crystal display panel 120 and no voltage is applied to the backlight unit 110. The external light passes through the color filter layer 130 and the polymer layer 123, and is reflected by the backlight unit 110. For this purpose, the backlight unit 110 operates as a reflective plate.

In one example, an inorganic EL device includes a spherical luminous body having a diameter of a few μm and relatively good (e.g., excellent) reflectivity. Therefore, a light emitting device formed of the inorganic EL device may be used as the backlight unit 110. In addition, the backlight unit 110 may include a diffusion plate (not shown) for generating more uniform light. In this example, the diffusion plate may serve as the reflective plate. In this case, the backlight unit 110 may be formed of other light emitting devices, besides an inorganic EL device.

Still referring to FIG. 4B, the reflected light passes through the polymer layer 123 and the color filter layer 130. And, because the reflected light passes through the color filter layer 130 at least twice, light of a particular color is generated. Barriers (e.g., shown in FIG. 1) may also be installed between the adjacent sub-pixels so that the light incident on the blue filter 130b is not emitted from the green filter 130g, for example.

As described above, when the backlight unit 110 acts as a reflective plate, the polymer dispersed liquid crystal display apparatus 100 may operate in the reflective and transmissive mode when both external light and light emitted from the backlight unit 110 are used. This is sometimes referred to herein as the semi-transmissive mode or the combination reflective transmissive mode.

FIG. 4C illustrates the operation of the polymer dispersed liquid crystal display apparatus 100 configured to operate in the reflective and transmissive mode. When a voltage is applied to the backlight unit 110, the blue light emitted from the backlight unit 110 excites the quantum dots 125$r$ and 125$g$ in the red and green sub-pixels, respectively. Therefore, red and green light is emitted from the red and green sub-pixels, respectively. Blue light emitted from the backlight unit 110 passes through the blue sub-pixel. In addition, the external light is reflected by the backlight unit 110, and then passes through the color filter layer 130. Because the polymer dispersed liquid crystal display apparatus 100 uses both external light and the light emitted from the backlight unit 110 in this example, the optical efficiency of the polymer dispersed liquid crystal display apparatus 100 may be improved.

Figure 5:
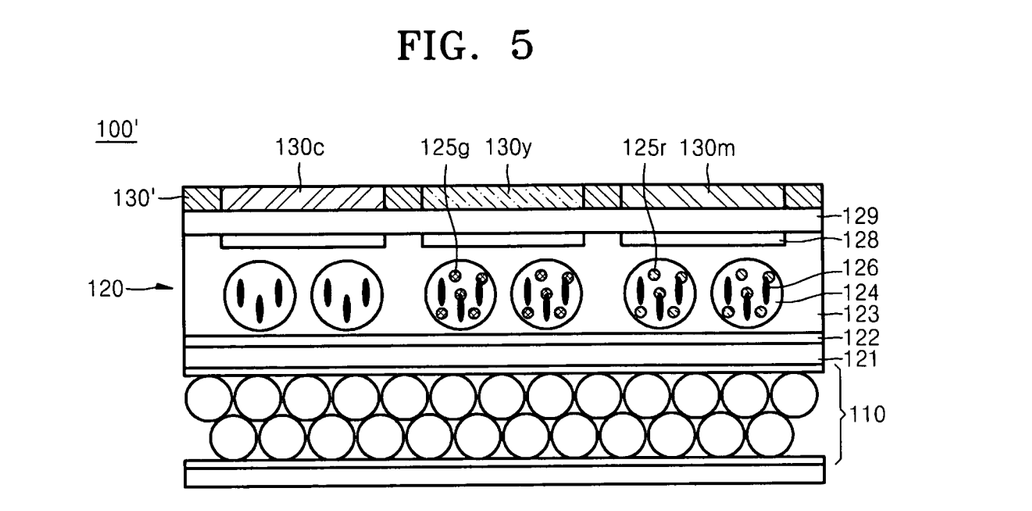
FIG. 5 is a cross-sectional view of a polymer dispersed liquid crystal display apparatus according to another example embodiment.

FIG. 5 is a cross-sectional view of a polymer dispersed liquid crystal display apparatus according to another example embodiment. The polymer dispersed liquid crystal display apparatus 100' shown in FIG. 5 has the same structure as the polymer dispersed liquid crystal display apparatus 100 illustrated in FIG. 3, except for the color filter layer 130'.

unlike the polymer dispersed liquid crystal display apparatus 100 illustrated in FIG. 3, the color filter layer 130' shown in FIG. 5 includes a cyan color filter 130$c$, a yellow color filter 130$y$, and a magenta color filter 130$m$. The color filter 130' having the above structure may improve brightness of the external light.

For example, to emit red light, a voltage is applied to (e.g., applied only to) the red sub-pixel in the polymer dispersed liquid crystal display apparatus 100 illustrated in FIG. 3. However, because some of the external light is absorbed by the color filter layer 130, the light emitted from the red sub-pixel may have a relatively dark red color. In the polymer dispersed liquid crystal display apparatus 100' illustrated in FIG. 5, to emit red light, a voltage is applied to sub-pixels corresponding to the yellow and magenta color filters 130$y$ and 130$m$. Yellow is a mixture of red and green colors, magenta is mixture of red and blue colors, and cyan is a mixture of green and blue colors. Therefore, red color may be obtained by mixing yellow and magenta colors. In addition, because the light is reflected by two sub-pixels, light of a bright red color may be obtained.

To emit green color light, a voltage is applied to the sub-pixels corresponding to the cyan and yellow color filters 130$c$ and 130$y$. To emit blue color light, a voltage is applied to the sub-pixels corresponding to the cyan and magenta color filters 130$c$ and 130$m$.

In the polymer dispersed liquid crystal display apparatus 100' illustrated in FIG. 5, brighter images may be displayed in the reflective mode of the polymer dispersed liquid crystal display apparatus 100'.

According to example embodiments, polymer dispersed liquid crystal display apparatuses may selectively operate in a reflective mode, transmissive mode or combination reflective-transmissive mode. Although not explicitly shown, the polymer dispersed liquid crystal display may be coupled to a controller or other switching device. The controller or switching device may include a light sensor configured to sense ambient light. In one example, the controller may be capable of switching the polymer dispersed liquid crystal display apparatus between the transmissive, reflective and transmissive-reflective modes based on the sensed ambient light. To do so, the controller may switch the backlight unit (e.g., backlight unit 110) on and off based on the sensed ambient light. In one example, if adequate ambient light is present to support the reflective mode, the controller may switch off the backlight unit. On the other hand, if adequate ambient is not present to support the reflective mode, the controller may switch on the backlight unit. The controller may make similar decisions based on power consumption of the polymer dispersed liquid crystal display apparatus. For example, if low power consumption is desired, the controller may switch off the backlight unit such that the polymer dispersed liquid crystal display apparatus operates in the reflective mode. On the other hand, if low power consumption is not desired, the controller may switch the backlight unit on such that the polymer dispersed liquid crystal display apparatus operates in the transmissive mode.

It should be understood that the example embodiments described therein should be considered in a descriptive sense only and not for purposes of limitation. Descriptions of features or aspects within each example embodiment should typically be considered as available for other similar features or aspects in other embodiments.

What is claimed is:

1. A display panel comprising:
   a polymer layer;
   a plurality of liquid crystal drops dispersed in the polymer layer; and
   a plurality of quantum dots mixed inside the liquid crystal drops, the quantum dots emitting one of a plurality of colors of light in response to an excitation light.

2. The display panel of claim 1, wherein the excitation light is blue light.

3. The display panel of claim 2, further comprising:
   a plurality of pixels, each of the plurality of pixels including,
   a blue sub-pixel, a green sub-pixel, and a red sub-pixel; wherein
      liquid crystal drops in the green sub-pixel include quantum dots, which emit green light in response to being excited by the blue light,
      liquid crystal drops in the red sub-pixel include the quantum dots, which emit red light in response to being excited by the blue light, and
      liquid crystal drops of the blue sub-pixel do not include quantum dots.

4. The display panel of claim 1, wherein the excitation light is ultraviolet (UV) light.

5. The display panel of claim 4, further comprising:
   a plurality of pixels, each of the pixels including,
   a blue sub-pixel, a green sub-pixel, and a red sub-pixel; wherein
      liquid crystal drops in the green sub-pixel include quantum dots, which emit green light in response to being excited by the UV light,
      liquid crystal drops in the red sub-pixel include the quantum dots, which emit red light in response to being excited by the UV light, and
      liquid crystal drops of the blue sub-pixel include quantum dots, which emit blue light in response to being excited by the UV light.

6. The display panel of claim 1, wherein quantum dots are also dispersed in the polymer layer outside of the liquid crystal drops.

7. A display apparatus comprising:
the display panel of claim 1; and
a backlight unit configured to emit the excitation light toward the display panel.

8. The display apparatus of claim 7, wherein the excitation light is blue light.

9. The display apparatus of claim 8, wherein the liquid crystal display panel includes,
a plurality of pixels, each of the plurality of pixels including,
a blue sub-pixel, a green sub-pixel, and a red sub-pixel; wherein
liquid crystal drops in the green sub-pixel include quantum dots, which emit green light in response to being excited by the blue light,
liquid crystal drops in the red sub-pixel include quantum dots, which emit red light in response to being excited by the blue light, and
liquid crystal drops of the blue sub-pixel do not include quantum dots.

10. The display apparatus of claim 9, further comprising:
a color filter layer having a blue filter, a green filter, and a red filter; wherein
the blue filter, the green filter, and the red filter are arranged to correspond to the blue, green, and red sub-pixels, respectively.

11. The display apparatus of claim 9, further comprising:
a color filter layer having a cyan filter, a yellow filter, and a magenta filter; wherein
the cyan filter, the yellow filter, and the magenta filter are arranged to correspond to the blue, green, and red sub-pixels, respectively.

12. The display apparatus of claim 9, further comprising:
a plurality of barriers disposed in the polymer layer, the plurality of barriers being configured to separate the blue, green, and red sub-pixels from each other.

13. The display apparatus of claim 7, wherein the excitation light is UV light, and the backlight unit emits the UV light.

14. The display apparatus of claim 13, wherein the liquid crystal display panel includes,
a plurality of pixels, each of the plurality of pixels including,
a blue sub-pixel, a green sub-pixel, and a red sub-pixel; wherein
liquid crystal drops in the green sub-pixel include quantum dots, which emit green light in response to being excited by the UV light,
liquid crystal drops in the red sub-pixel include quantum dots, which emit red light in response to being excited by the UV light, and
liquid crystal drops of the blue sub-pixel include quantum dots, which emit blue light in response to being excited by the UV light.

15. The display apparatus of claim 14, further comprising:
a color filter layer having a blue filter, a green filter, and a red filter; wherein
the blue filter, the green filter, and the red filter are arranged to correspond to the blue, green, and red sub-pixels, respectively.

16. The display apparatus of claim 14, further comprising:
a color filter layer having a cyan filter, a yellow filter, and a magenta filter; wherein
the cyan filter, the yellow filter and the magenta filter are arranged to correspond to the blue, green, and red sub-pixels, respectively.

17. The display apparatus of claim 14, further comprising:
a plurality of barriers disposed in the polymer layer, the plurality of barriers being configured to separate the blue, green, and red sub-pixels from each other.

18. The display apparatus of claim 7, wherein the quantum dots are further dispersed in the polymer layer outside of the liquid crystal drops.

19. The display apparatus of claim 7, wherein the backlight unit is configured to operate as a reflective plate for reflecting external light incident on the liquid crystal display panel.

20. The display apparatus of claim 7, wherein the backlight is configured to be selectively activated and deactivated based on sensed ambient light.

21. The display apparatus of claim 20, wherein when the backlight unit is deactivated, the liquid crystal display apparatus operates in a reflective mode.

22. The display apparatus of claim 20, wherein when the backlight unit is activated, the liquid crystal display apparatus operates in one of a transmissive mode and a transmissive-reflective mode.

23. A flexible display apparatus comprising:
the display panel of claim 1; and
a backlight unit configured to emit the excitation light toward the display panel.

24. An electronic paper display apparatus comprising:
the display panel of claim 1; and
a backlight unit configured to emit the excitation light toward the display panel.

25. A liquid crystal display apparatus comprising:
the display panel of claim 1; and
a backlight unit configured to emit the excitation light toward the display panel.

26. A display panel comprising:
a polymer layer;
a plurality of liquid crystal drops dispersed in the polymer layer; and
a means for emitting one of a plurality of colors of light in response to an excitation light, the means for emitting being mixed inside the liquid crystal drops.

27. The display panel of claim 26, further comprising:
a plurality of pixels, each of the plurality of pixels including,
a blue sub-pixel, a green sub-pixel, and a red sub-pixel; wherein
the green sub-pixel includes a means for emitting green light in response the excitation light, and
the red sub-pixel includes a means for emitting red light in response the excitation light.

28. A display apparatus comprising:
the display panel of claim 26; and
a backlight unit configured to emit the excitation light toward the display panel.

29. The display apparatus of claim 28, further comprising:
a color filter layer having a blue filter, a green filter, and a red filter; wherein
the blue filter, the green filter, and the red filter are arranged to correspond to the blue, green, and red sub-pixels, respectively.

30. The display apparatus of claim 28, further comprising:
a color filter layer having a cyan filter, a yellow filter, and a magenta filter; wherein
the cyan filter, the yellow filter, and the magenta filter are arranged to correspond to the blue, green, and red sub-pixels, respectively.

* * * * *